United States Patent [19]
Fujikura et al.

[11] Patent Number: 5,960,358
[45] Date of Patent: Sep. 28, 1999

[54] TELEPHONE SYSTEM PROVIDING A TALKING OPERATION AFTER MAIN POWER SUPPLY FAILURE

[75] Inventors: Toshiaki Fujikura, Chiba; Daisuke Nakamura, Narashino, both of Japan

[73] Assignee: Uniden Corporation, Tokyo, Japan

[21] Appl. No.: 08/812,074

[22] Filed: Mar. 6, 1997

[30]     Foreign Application Priority Data

Nov. 29, 1996   [JP]   Japan .................................... 8-319061

[51] Int. Cl.⁶ .................................................. H04Q 7/20
[52] U.S. Cl. ........................... 455/462; 455/572; 455/569
[58] Field of Search ................................ 455/462, 465, 455/403, 550, 561, 569, 572–574, 402

[56]            References Cited

U.S. PATENT DOCUMENTS

| | | | |
|---|---|---|---|
| 4,509,201 | 4/1985 | Sekigawa et al. | ....................... 455/572 |
| 4,995,072 | 2/1991 | Pedigo | .................. 455/574 X |
| 5,400,388 | 3/1995 | Heo | .......................... 455/572 |
| 5,423,077 | 6/1995 | Ueda | ........................ 455/574 |
| 5,553,138 | 9/1996 | Heald et al. | .......................... 455/572 X |
| 5,572,575 | 11/1996 | Yamamoto et al. | ................. 455/462 X |

FOREIGN PATENT DOCUMENTS

| | | |
|---|---|---|
| 63-82047 | 4/1988 | Japan . |
| 2-20156 | 1/1990 | Japan . |
| 3-145849 | 6/1991 | Japan . |

*Primary Examiner*—Dwayne D. Bost
*Assistant Examiner*—William G. Trost
*Attorney, Agent, or Firm*—McDermott, Will & Emery

[57]              ABSTRACT

When an SP key is operated when power from a commercial utility is disconnected, an energized state forming circuit forms an energized state from a subscriber's line and power is supplied from the subscriber's power supply section through the energized state forming circuit to a microcomputer. The microcomputer thus is operated from the subscriber's line even after power failure occurs.

4 Claims, 5 Drawing Sheets

TELEPHONE SYSTEM PROVIDING A TALKING OPERATION AFTER MAIN POWER SUPPLY FAILURE

FIELD OF THE INVENTION

The present invention relates to a telephone system, and more particularly to a telephone system in which a talking operation is executed through a subscriber's line by receiving power from a commercial utility.

BACKGROUND OF THE INVENTION

Conventionally, one type of telephone system has a cordless telephone set with a cordless receiver and enables a talking operation through a telephone line with this cordless telephone set.

Generally the telephone system as described above does not have a mechanical hook switch for having the cordless telephone set hooked.

As described above, the telephone system does not comprise the hook switch, so that the telephone system can not maintain an energized state with the subscriber's line. For this reason, as a countermeasure against power failure due to disconnection of the power supply from the commercial utility, power required for operations of a microcomputer is backed up by using a backup power such as a battery or an electric double-layered capacitor or the like.

In the telephone system according to the example based on the conventional technology described above, power is backed up by using a backup power source when power failure occurs, however, a battery or a capacitor supplies power thereto by means of discharge, so that a period of usable time of the battery or the like for backup is restricted depending on output capacity stored in the battery or the like.

SUMMARY OF THE INVENTION

It is an object of the present invention to provide a telephone system in which a talking operation can be executed as in the normal state without time limit even after a power failure occurs.

To solve the problems and achieve the object described above, with the telephone system according to the present invention, an energized state forming circuit forms an energized state from a subscriber's line when a contact switch is operated while power from a commercial utility is disconnected. Communication control is provided with the energized state forming circuit by supplying power to a microcomputer, so that the microcomputer is operated as in the normal state with the power supplied from the subscriber's line after power failure. As a result, it is possible to execute a talking operation through a telephone line as usual without time limit even after power is disconnected.

In a telephone system according to the present invention, a talking state is maintained with a hands-free phone section when it is detected that power from a commercial utility has been disconnected during a talking operation, so that the connected state with a subscriber's line is maintained, and a microcomputer is operated with power supplied from the subscriber's line even after power failure. For this reason it is possible to execute a talking operation through a telephone line as usual without time limit even after power is disconnected.

In a telephone system with the present invention, when a wireless section for executing radio communication with a cordless telephone set is connected to a subscriber's line when it is detected that power from a commercial utility has been disconnected during a talking operation, the talking operation is suspended and connection with the subscriber's line is switched from the wireless section to a hands-free phone section. Then, if a contact switch is operated, the suspended state is released, so that the talking operation with the cordless telephone set before power is disconnected is switched to the talking operation with the hands-free phone section through the suspended state after power is disconnected. In this case, a connected state with a subscriber's line is maintained, and a microcomputer is operated with power supplied from the subscriber's line even after power failure. For this reason, it is possible to execute talking operation through a telephone line as usual without time limit even after power is disconnected.

In a telephone system according to the present invention, a DTMF signal is sent to the subscriber's line as well as to the hands-free phone section during the suspended state, so that it is possible to notify a fact that the talking state has been suspended to a receiver's terminal connected to the subscriber's line, and also to maintain the connected state with the destination's terminal. It is also possible to notify the fact that the talking operation is in the suspended state to a user through the hands-free phone section and to instruct the user to talk with the hands-free phone section.

Other objects and features of this invention will become understood from the following description with reference to the accompanying drawings.

DESCRIPTION OF THE PREFERRED EMBODIMENTS

Detailed description is made hereinafter for preferred embodiments of the present invention with reference to the related drawings.

Figure 1:
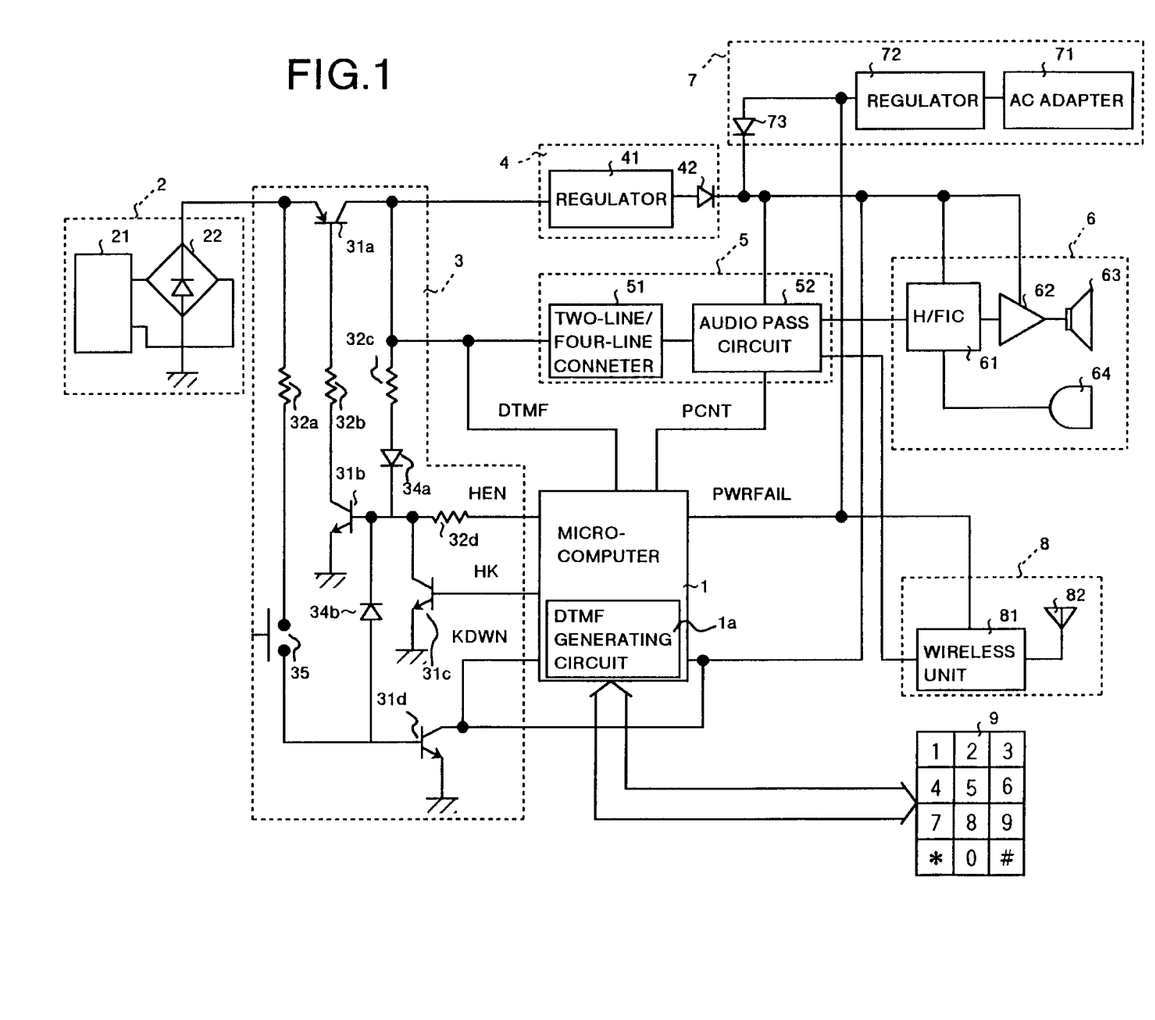
FIG. 1 is a block diagram showing a telephone system according to one of the embodiments of the present invention.

FIG. 1 is a block diagram showing a telephone system according to one of the embodiments of the present invention. The telephone system shown in FIG. 1 comprises, for instance, a microcomputer 1, a line connecting section 2, an energized state forming circuit 3, a subscriber's line power section 4, a talking connection switching circuit 5, a hands-free phone section 6, a commercial utility section 7, a wireless section 8, and a key section 9.

The microcomputer 1 controls an entire device with power (e.g. 5V) supplied from the commercial utility section 7 or power (e.g. 3V) from the subscriber's line power section 4. The microcomputer 1 has a DTMF generating circuit 1a, and generates a DTMF signal from the DTMF generating circuit 1a, for instance, when power is disconnected during a talking operation though a telephone line. The line connecting section 2 has a line connecting circuit 21 as well as a bridge diode 22, and executes transaction of audio signals through this bridge diode 22.

The energized state forming circuit 3 comprises a PNP type transistor 31a, NPN type transistors 31b, 31c, 31d, resistors 32a, 32b, 32c, 32d, diodes for prevention of a back-flow 34a, 34b, and a speaker-phone (described SP hereinafter) switch 35.

In the transistor 31a, the emitter thereof is coupled to the bridge diode 22, the collector thereof is coupled to the subscriber's line power section 4, and the base thereof is connected to the collector of the transistor 31b through the resistor 32b.

In the transistor 31b, the emitter thereof is grounded, and the base thereof is coupled to the microcomputer 1 through the resistor 32d as well as to the collector of the transistor 31c. In the transistor 31c, the emitter thereof is grounded, and the base thereof is coupled to the microcomputer 1.

In the transistor 31d, the emitter thereof is grounded, the base thereof is coupled to the SP switch 35, and the collector thereof is coupled to the subscriber's line power section 4 as well as to a power supplying line of the commercial utility section 7.

The transistor 31b and the resistor 32d are coupled to each other through the diode 34b, and the SP switch 35 and the transistor 31d are coupled to each other also through the diode 34b, so that current flows only to the base of the transistor 31b from the SP switch 35, whereby back-flow is prevented.

The emitter side of the transistor 31a is coupled to the SP switch 35 through the resistor 32a, and the collector side thereof is coupled to the base side of the transistor 31b through the resistor 32c and the diode 34a.

The subscriber's line power section 4 has a regulator 41 and a diode 42 for prevention of back-flow, and supplies power to the internal circuit including the microcomputer 1. The regulator 41 is coupled to the microcomputer 1 through the diode 42 and supplies a voltage of, for instance, 3V to the internal circuit including the microcomputer 1 by power supply from the subscriber's line.

The talking connection switching circuit 5 has a two-line/four-line converter 51 and an audio pass circuit 52, and switches a pass setting to either one of talking with the hands-free phone section 6 and talking with a cordless telephone set, not shown herein, through the wireless section 8.

The two-line/four-line converter 51 converts audio signals transaction to the two-line or to the four-line when talking is made with the hands-free phone section 6 or with the cordless telephone set.

The hands-free phone section 6 has such a configuration that a speaker 63 and a microphone 64 are coupled to a hands-free phone IC (described H/FIC hereinafter) through an amplifier 62. A power supply line connected to the subscriber's line as well as to the commercial utility section 7 is connected to the H/FIC 61 as well as to the amplifier 62.

The commercial utility section 7 comprises an AC adapter 71, a regulator 72, and a diode 73 for prevention of back-flow, and supplies power to the internal circuit including the microcomputer 1. The AC adapter 71 converts the commercial utility (AC power) to DC power, and the regulator 72 supplies a voltage of, for instance, 5V to the internal circuit including the microcomputer 1 through the diode 73 based on the DC power supplied from the AC adapter 71.

The wireless section 8 has a wireless unit 81 and an antenna 82, and executes radio communication with the cordless telephone set not shown herein. The wireless unit 81 is coupled to the audio pass circuit 52, issues the audio signal received through the antenna 82 to the audio pass circuit 52, and sends out the audio signal sent from the audio pass circuit 52 to a cordless telephone set by changing it to radio waves.

It should be noted that the wireless unit 81 is coupled to an output terminal of the regulator 72 in the commercial utility section 7, and operates with a voltage of 5V supplied from the regulator 72.

The key section 9 has ten numeric keys from "0" to "9", a "*" key, and a "#" key. Each of the keys is operated by being pushed, whereby dialing for originating a call or various types of functions are executed.

Next, a description is made for operations.

The telephone system according to this embodiment of the present invention does not provide therein backup power when power failure occurs, so that, when a call is originated when power failure occurs, it is required to form an energized state from the subscriber's line by means of operation of the SP switch 35 in the energized state forming circuit 3.

In a case where power failure occurs during talking with the hands-free phone section 6, an operation for forming an energized state by the energized state forming circuit 3 is not required because the line connection has been established and the telephone system is in an energized state from the subscriber's line.

However, when a power failure occurs during talking with the cordless telephone set through the wireless section 8, the line connection has been established and the telephone system is in an energized state from the subscriber's line, but the wireless unit 81 does not operate with 5V. Switching to the hands-free phone section 6, which can operate even with 3V, is required.

In the state where power is disconnected, power is supplied to the microcomputer 1 from neither the subscriber's line power section 4 nor the commercial utility section 7, and for this reason, the microcomputer 1 is disabled.

Figure 2:
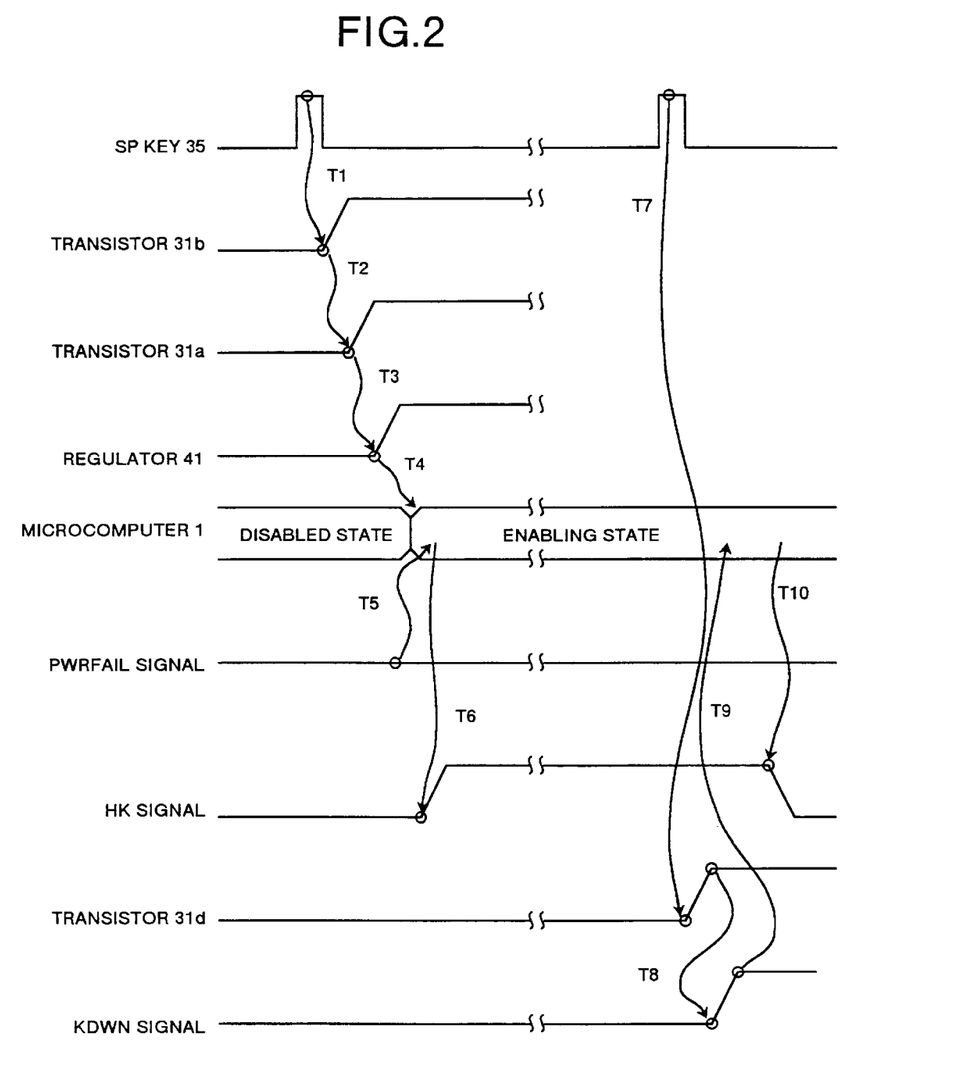
FIG. 2 is a timing chart for a signal and each section in a telephone system according to FIG. 1.

Description is made herein for a method of establishing an energized state during a power failure. FIG. 2 is a timing chart of signals of the telephone system shown in FIG. 1 as well as each of the sections. In the figure, the reference numerals T1 to T10 show timing respectively in which the signals and the state of each section are changed.

When power is disconnected, at first the SP key 35 is pushed, then line current instantly flows into the internal side of the telephone system from the subscriber's line through the line connecting section 2. When current flows thereinto, the SP switch 35 is momentarily turned ON by means of the point contact and the transistor 31b is turned ON at time T1.

As described above, when the transistor 31b is turned ON, current flows into the collector of the transistor 31b from the resistor 32b. At time T2, the transistor 31a passes current from the subscriber's line from the emitter to the collector thereof to supply power to the regulator 41.

When current flows thereinto, current flowing to the collector side of the transistor 31a is supplied into the base of the transistor 31b through the resistor 32c and the diode 34a. With this operation, the transistor 31b can be maintained ON, and accordingly, the transistor 31a continuously passes a current supplied from the subscriber's line from the emitter to the collector thereof.

For this reason, a loop current is generated in the loop configuration comprising the transistor 31a, resistor 32c, diode 34a, transistor 31b, and resistor 32b, so that an energized state from the subscriber's line can continuously be formed without further pressing the SP switch 35.

When the regulator 41 starts operating, power is supplied to the microcomputer 1 with a voltage of 3V at time T4.

As described above, when the microcomputer 1 shifts from the disabled state to the enabling state, a talking operation can be started by using the hands-free phone section 6.

The microcomputer 1, when it is initialized, fetches a power determination (described PWRFAIL hereinafter) signal from a signal line coupled to the output terminal of the regulator 72 before starting the normal operation (time T5), and makes a determination as to whether power can be supplied from a commercial utility or not (power is disconnected or not).

As a PWRFAIL signal is LOW when the AC adaptor 71 is not connected to the commercial utility or when power is disconnected, the microcomputer 1 receives power from the subscriber's line to start a talking operation.

For instance, when a dial operation in the key section 9 is detected, a hook (described HK hereinafter) signal is supplied to the transistor 31c at time T6, and a hook enable signal (described HEN hereinafter) is supplied to the microcomputer 1.

Then, when the SP switch 35 is pushed again, the transistor 31d is turned On at time T7. At this point of time, power is supplied from the regulator 41 to the microcomputer 1, and for this reason, a key-down (described KDWN hereinafter) signal of the SP switch 35 is supplied to the microcomputer 1.

The KDWN signal in this case indicates end of talking, so that the microcomputer 1 starts an ending operation of talk, and turns OFF the HK signal at time T10 to end the talking operation.

Next, a concrete description is made for operations of the microcomputer 1.

Figure 3:
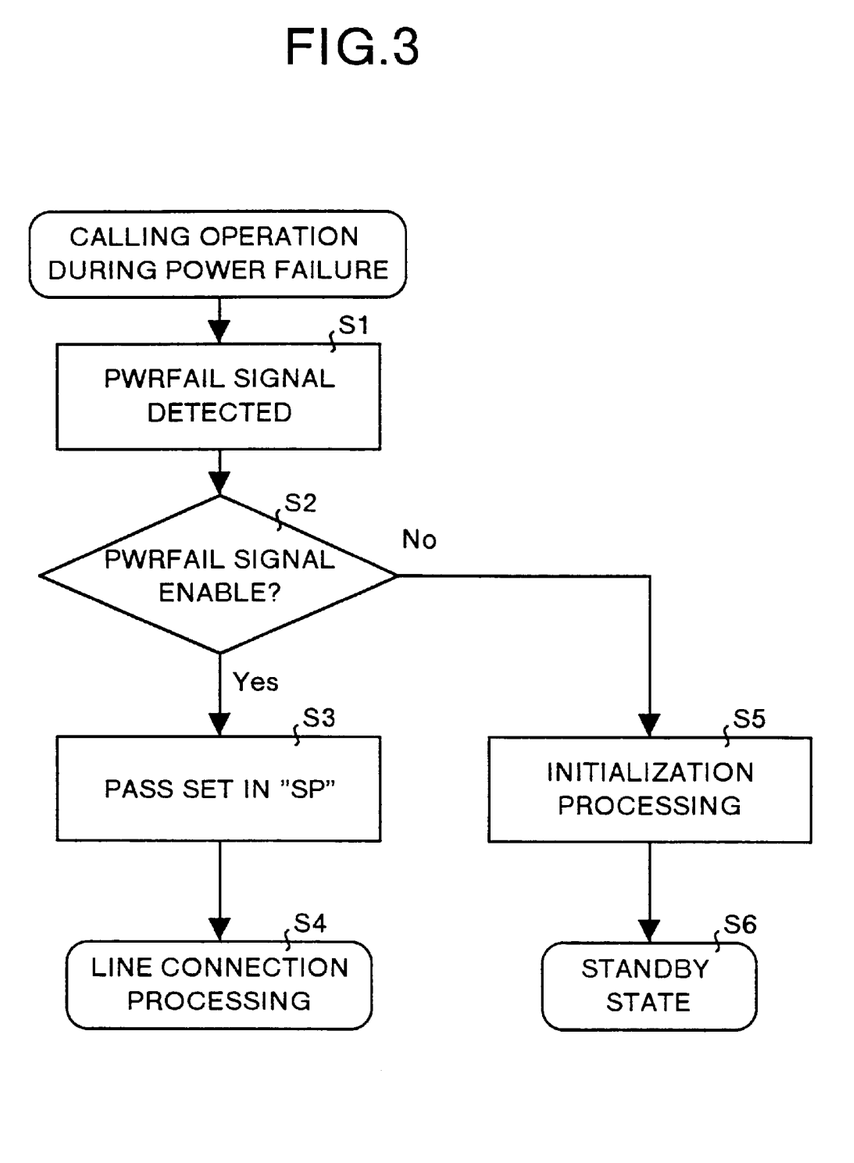
FIG. 3 is a flow chart explaining a calling operation while power is disconnected.

FIG. 3 is a flow chart for explaining a calling operation during disconnection of power. During disconnection of power, as described above, when loop current is formed in the energized state forming circuit 3 according to pushing of the SP switch 35 as a starting point, the microcomputer 1 is initialized by power from the subscriber's utility line section 4.

The microcomputer 1 detects, when it is initialized, at first, a PWRFAIL signal, and makes a determination as to whether the PWRFAIL signal is enabled or not (step S1). With this operation, a determination is made as to whether power can be received from the commercial utility or not (during disconnection of power or not).

When the AC adapter 71 is not connected to the commercial utility or when disconnection of power is continued, the PWRFAIL signal is LOW, so that the microcomputer 1 determines that the signal is enabled (step S2), and sets a pass in the side of the hands-free phone section 6 for the audio pass circuit 52. Namely, the microcomputer 1 supplies a pass control (PCNT) signal indicating "SP" (a speakerphone) to the audio pass circuit 52.

After this operation, the microcomputer 1 controls dialing or the like to start line connection processing (step S3).

In the step S2, in a case where it is determined that the PWRFAIL signal is disabled, power from the commercial utility section 7 becomes effective, so that the microcomputer 1 is in a standby state for a request of a call origination or for being called (step S6) after executing normal initialization (step S5).

It should be noted that, in a case where there is an incoming call during disconnection of power, the operations are the same as those when the call is originated as described above except for the fact that a ringer is activated according to a bell signal, so that description thereof is omitted herein.

Figure 4:
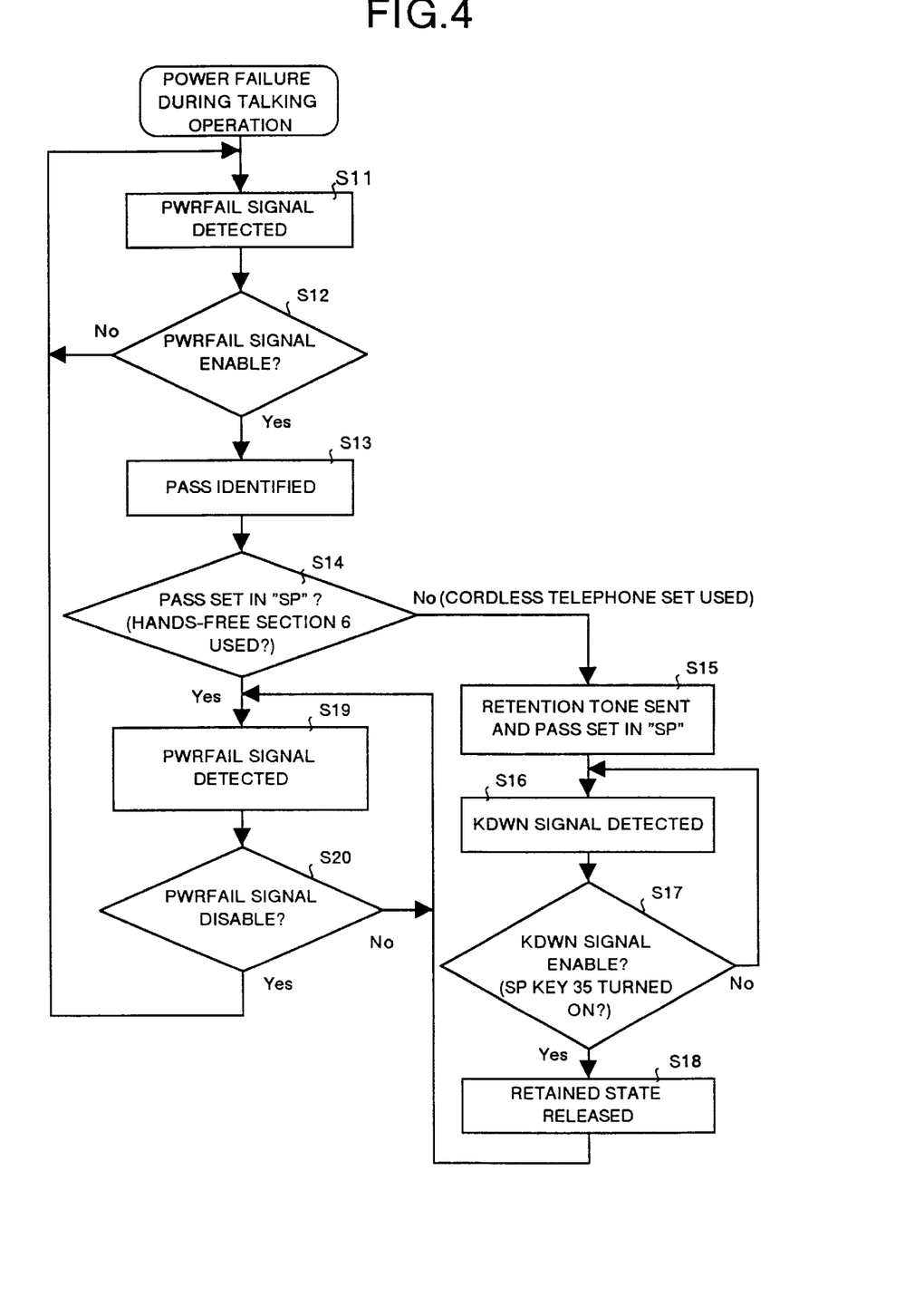
FIG. 4 is a flow chart explaining operation while power is disconnected during a talking operation.

FIG. 4 is a flow chart for explaining operations for power failure during a talking operation through a telephone line. During this talking operation, the microcomputer 1 detects a PWRFAIL signal (step S11), and repeatedly executes processing for making a determination as to whether the state is enabled or disabled (step S12).

If the PWRFAIL signal shifts to an enabled state, the microcomputer 1 identifies the pass set in the current audio pass circuit 52 (step S13) and determines which pass is used (step S14).

The pass includes an "SP" (a pass for the hands-free phone section 6) and a "CT" which is a pass for a cordless telephone set. When the pass is set in the "SP", a talking operation with the hands-free phone section 6 is continued in an energized state from the subscriber's line, so that processing shifts to step S19, while when the pass is set in the "CT", a talking operation with the cordless telephone set is switched to that with the hands-free phone section 6, so that processing shifts to step S15.

When processing shifts from step S14 to step S19, the microcomputer 1 detects the PWRFAIL signal again (step S19), and makes a determination as to whether the state is disabled or not this time (step S20). This determination is an operation for recognizing that the commercial utility section 7 recovers, and when it is recognized that processing shifts from the enabled state to the disabled state, it is determined that the commercial utility section 7 has recovered, so that processing returns to step S11 again.

Also in a case where processing shifts from step S14 to step S15, the microcomputer 1 controls the DTMF generating circuit 1a to generate a DTMF signal, and sends the signal to the subscriber's line and to the speaker 63 of the hands-free phone section 6. This DTMF signal is sent as a retention tone, used for holding a line connection with a talking partner or telling of power failure to a user of the telephone system.

It should be noted that, when a power is disconnected while talking with a cordless telephone set is in progress, RF power from the wireless section 8 to the cordless telephone set is disconnected, so that switching to talking with the hands-free phone section 6 can be guided in the cordless telephone set, for instance, by sounding an alarm indicating out of range.

Also, in this step S15, the pass is forcefully switched to the "SP" in accordance with sending the retention tone. With this operation, the subscriber's line and the hands-free phone section 6 are electrically coupled to each other.

The retained state is released only by pushing the SP key 35, so that the microcomputer 1 detects a KDWN signal (step S16) after the operation and on, and repeatedly executes processing for making a determination as to whether the state is enabled, namely the SP key 35 is pushed or not (step S17).

Then, when it is determined that the KDWN signal is enabled in step S17, the microcomputer 1 stops generating a DTMF signal by the DTMF generating circuit 1a to release the retention (step S18). With this operation, control over talking provided by using the hands-free phone section 6 which has already been coupled to the subscriber's line is executed.

In a case where this hands-free phone section 6 provides control over talking, it is recognized that the commercial utility is recovered by detecting the enabled state of the PWRFAIL signal in steps S19 and S20.

Figure 5:
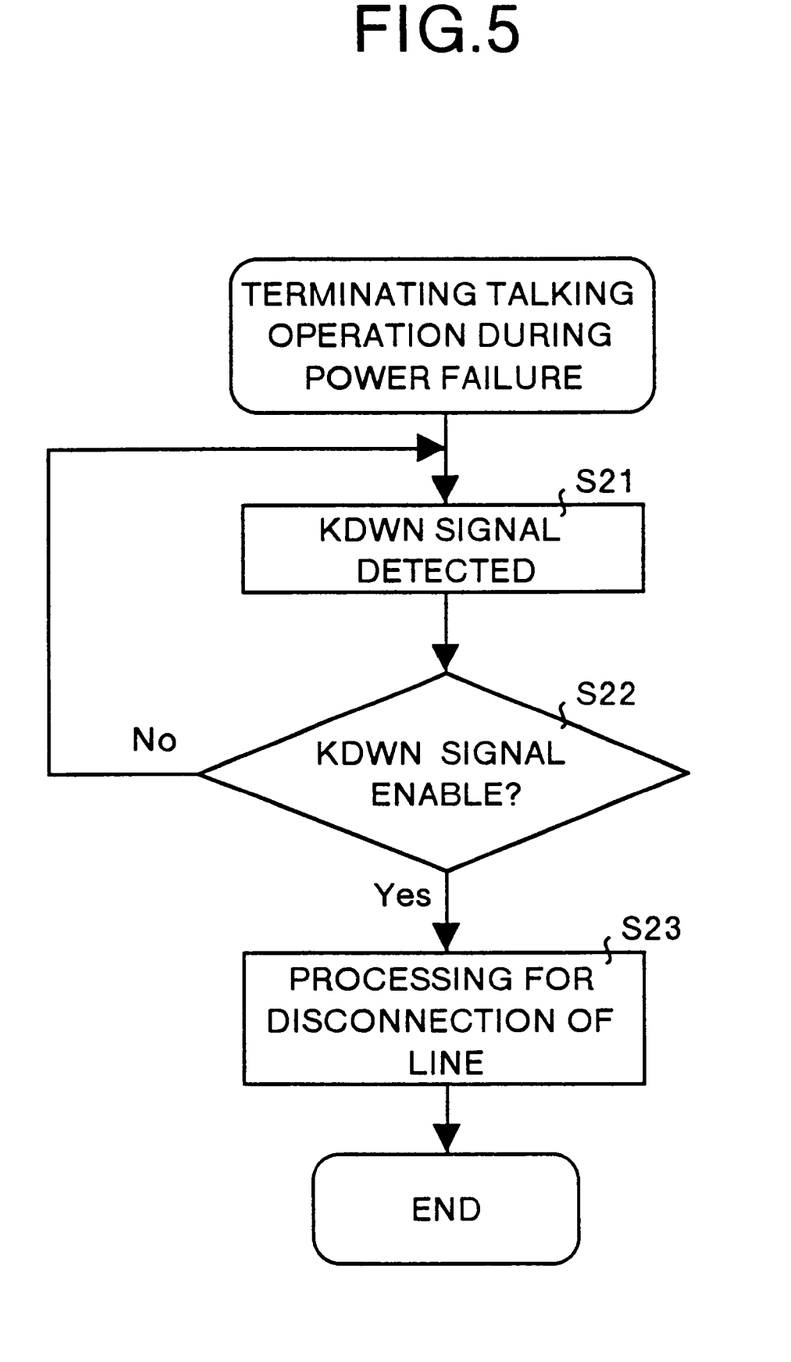
FIG. 5 is a flow chart explaining a terminating operation while power is disconnected.

FIG. 5 is a flow chart for explaining operations for terminating talking operation through a telephone line. During talking when power is disconnected, the microcomputer 1 detects a KDWN signal (step S21), and repeatedly executes processing for making a determination as to whether the state has shifted to an enabled state or not (step S22).

When the enabled state of the KDWN signal is identified in step S22, the microcomputer 1 executes disconnection of the line to end the talking operation (step S23).

Namely, when the SP key 35 is pushed, the KDWN signal shifts to the enabled state, so that control over end of talking through a telephone line during the power failure is executed by pushing the SP key 35.

As described above, with the embodiment of the present invention, an energized state forming circuit forms an energized state from a subscriber's line when the SP switch 35, which is a contact switch 35, operated while power from a commercial utility is disconnected. Communication control is provided with the energized state forming circuit 3 by supplying power to a microcomputer 1. Hence, the microcomputer 1 is operated as in the normal state with power supplied from the subscriber's line after a power failure. As a result, it is possible to execute a talking operation through a telephone line as usual without time limit even after power is lost.

Also, a talking state is maintained with a hands-free phone section 6 in a case where it is detected that power from a commercial utility has been disconnected during a talking operation, so that the connected state with a subscriber's line is maintained, and a microcomputer 1 is operated by power supplied from the subscriber's line even after power failure. For this reason it is possible to execute a talking operation through a telephone line as usual without time limit even after power is lost.

In a case where a wireless section 8 for executing radio communication with a cordless telephone set is connected to a subscriber's line when it is detected that power from commercial utility has been disconnected during a talking operation, the talking operation is suspended and connection with the subscriber's line is switched from the wireless section 8 to a hands-free phone section 6. Then, if a contact switch 35 is operated, the suspended state is released, so that the talking operation with the cordless telephone set before the power is disconnected is switched to the talking operation with the hands-free phone section 6 through the suspended state after power is disconnected. In this case, a connected state with a subscriber's line is maintained, and the microcomputer 1 is operated with power supplied from the subscriber's line even after power failure. For this reason, it is possible to execute talking operation through a telephone line as usual without time limit even after power is lost.

Also, a DTMF signal is sent to the subscriber's line as well as to the hands-free phone section 6 during the suspended state, by controlling the DTMF generating circuit 1a, so that it is possible to notify that the talking state has been suspended to a receiver's terminal connected to the subscriber's line, and also to maintain the connected state with the destination's terminal. It is also possible to notify that the talking operation is in the suspended state to a user through the hands-free phone section 6 and to instruct the user to talk with the hands-free phone section 6.

As described above, with the telephone system according to the present invention, an energized state forming circuit forms an energized state from a subscriber's line when a contact switch is operated while power from commercial utility is disconnected, and communication control is provided with the energized state forming circuit by supplying power to a microcomputer. The microcomputer thus is operated like in the normal state with power supplied from the subscriber's line after power failure. There accordingly is provided the advantage that it is possible to provide a telephone system which can execute a talking operation through a telephone line as usual without time limit even after power is lost.

With the telephone system according to the present invention, a talking state is maintained with a hands-free phone section in a case where it is detected that power from a commercial utility has been disconnected during a talking operation. The connected state with a subscriber's line is thus maintained, and a microcomputer is operated with power supplied from the subscriber's line even after power failure. This provides the advantage of a telephone system which can execute a talking operation through a telephone line as usual without time limit even after power is lost.

With the telephone system according to the present invention, in a case where a wireless section for executing radio communication with a cordless telephone set is connected to a subscriber's line when it is detected that power from a commercial utility has been disconnected during a talking operation, talking operation is suspended and connection with the subscriber's line is switched from the wireless section to a hands-free phone section. Then, if a contact switch is operated, the suspended state is released, so that the talking operation with the cordless telephone set before the power is disconnected is switched to the talking operation with the hands-free phone section through the suspended state after the power is disconnected. In this case, a connected state with a subscriber's line is maintained, and a microcomputer is operated with power supplied from the subscriber's line even after power failure. This provides a telephone system which can execute talking operation through a telephone line as usual without time limit even after power is disconnected.

With the telephone system according to the present invention, a DTMF signal is sent to the subscriber's line as well as to the hands-free phone section during the suspended state. This advantageously provides a telephone system which can notify a fact that the talking state has been suspended to a receiver's terminal connected to the subscriber's line to maintain the connected state with the destination's terminal, and also which can notify that the talking operation is in the suspended state to a user through the hands-free phone section to instruct the user to talk with the hands-free phone section.

This application is based on Japanese patent application No. HEI 8-319061 filed in the Japanese Patent Office on Nov. 29, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A telephone system enabling talking over a telephone line via a subscriber's line and having a hands-free phone section and a wireless section, a microcomputer receiving power from a commercial utility and providing controls over talking through the telephone lines and a contact switch activating and deactivating operation of the hands-free phone section by the user at either the start or during a talking operation, said telephone system comprising:

an energized state forming circuit for forming an energized state from said subscriber's line when said contact switch is operated while power from said commercial utility is disconnected; and a power supply circuit connected to said energized state forming circuit for supplying power to said microcomputer based on power supplied from said energized state forming circuit when an energized state is formed by said energized forming circuit; wherein said microcomputer comprises:

a determiner configured to make a determination as to whether power is being supplied from said commercial utility or from said power supply circuit when the microcomputer is activated, when power from said commercial utility is disconnected during a talking operation using the wireless section, the microcomputer becomes inactive until said contact switch is operated to form an energized state from said subscriber's line via said energized state forming circuit; and a communication controller providing communication controls based on power supplied from said power supply circuit when it is determined by said determiner that power is being supplied from said power supply circuit.

2. A telephone system having a cordless telephone set, a microcomputer receiving power from a commercial utlilty and providing controls over talking through a telephone line, a contact switch operating start and end of a talking operation, a wireless section for receiving power from said commercial utility and executing radio communications with said cordless telephone set, a hands-free phone section including a speaker and a microphone, a connection circuit for connecting said subscriber's line to either one of said wireless section and said hands-free phone section, said telephone system enabling a talking operation through said subscriber's line and also having a power supply circuit for supplying power to said microcomputer with a voltage lower than said commercial power based on power supplied through said subscriber's line in parallel to power supplied from said commercial utility; wherein said microcomputer comprises;

an error position detector detecting disconnection of power from said commercial utility during a talking operation;

a determiner configured to determine a target for connection of said connection circuit when it is detected by said error position detector that the power supply has been disconnected;

a retention/connection switching controller suspending a talking operation only when it is determined by said determiner that said target for connection is said wireless section, and also for operating said connection circuit to switch connection with said subscriber's line from said wireless section to said hands-free phone section; and a retention release controller releasing said suspended state when said contact switch is operated while a talking operation is set in the suspended state by said retention/connection switching controller.

3. The telephone system according to claim 2, wherein said retention/connection switching controller has a DTMF generating circuit and sends a DTMF signal generated by said DTMF generating circuit to said subscriber's line as well as to said hands-free phone section.

4. In a telephone terminal having a wireless section and a telephone section with a microphone and a speaker, and a contact switch activating and deactivating operation of the telephone section by the user, a method of preventing the telephone terminal from being disconnected from a telephone line when power to said telephone terminal from an external power supply is terminated during a talking operation using the wireless section, comprising the steps of:

detecting termination of the external power supply;

disconnecting the wireless section from the telephone line; and activating the telephone section via the contact switch to connect the telephone section to the telephone line and supplying the telephone terminal with power from the telephone line.

* * * * *